T. F. Wenman,
Water Filter,
Nº 4,437.   Patented Apr. 4, 1846.
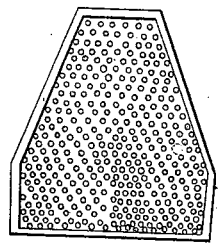
Fig. 3
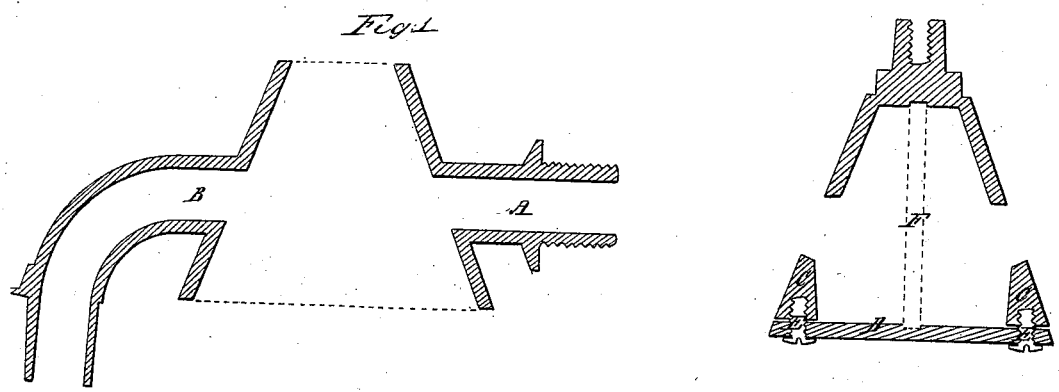
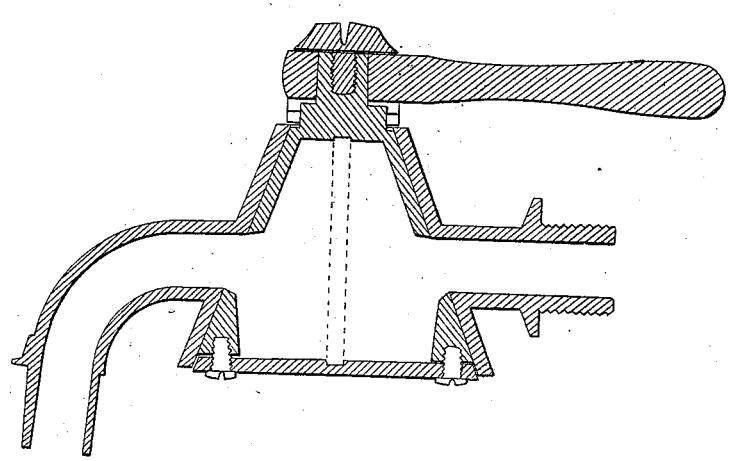

UNITED STATES PATENT OFFICE.

THOMAS F. WENMAN, OF NEW YORK, N. Y.

FILTERING-COCK.

Specification of Letters Patent No. 4,437, dated April 4, 1846.

*To all whom it may concern:*

Be it known that I, THOMAS F. WENMAN, of the city, county, and State of New York, have invented a new Filtering-Cock for the Purpose of Filtering Water and other Liquid Fluids; and I do hereby declare that the following is a full and exact description.

The nature of my invention consists in placing a double metallic partition, perforated with holes, containing felt, sponge or other filtering substance, into or across the center of the inner cone of the cock, making the same perfectly water tight around the edges, so that all the water or liquid fluid pass through the filter partition.

To enable others skilled in the art to make and use my invention, I will proceed to describe its construction and operation.

The outside cone is formed with an inlet on one side and an outlet on the other as at Figure 1 and shown as A and B in the accompanying drawing. The inner cone or core of the cock is formed the same as the outer with the following additions as Fig. 2. Around the inner edge at the bottom is a solid flange C to which a bottom D is screwed with the screws E so as to make it water tight, the upper part of the cone for the shoulder for the washer, handle and screw. In the inside of the inner cone a groove F is cut, into which the two perforated plates with the filtering substance between is fixed the perforated plates shown at Fig. 3. The operation of clearing the filter is performed by turning the handle on the opposite side from whence it has been running for the purpose of cleansing the filter and fitting it for use again.

What I claim as my invention and desire to secure by Letters Patent is—

The application of the filter within the inner cone of the cock by means of a groove made in the inner cone also on the bottom plate as shown at Fig. 2 placing the two perforated plates as Fig. 3 with the filtering substance between them as shown at letter F so that all the water or other liquid fluids has to pass through the plates, and filtering substance above named, substantially in the manner, and for the purpose described.

New York February 7th, 1846.

THOS. F. WENMAN.

Witnesses:
   IRA TODD,
   A. TEN BROECK.